United States Patent [19]

Engelstein

[11] Patent Number: 5,287,767
[45] Date of Patent: Feb. 22, 1994

[54] VEHICLE STEERING WHEEL COVER

[75] Inventor: Jacob Engelstein, Seattle, Wash.

[73] Assignee: Classic Accessories, Inc., Seattle, Wash.

[21] Appl. No.: 936,043

[22] Filed: Aug. 25, 1992

[51] Int. Cl.$^5$ .............................................. B62D 1/06
[52] U.S. Cl. .................................................... 74/558
[58] Field of Search ................ 74/558, 551.9, 558.5, 74/552

[56] References Cited

U.S. PATENT DOCUMENTS

| | | | |
|---|---|---|---|
| 1,190,781 | 7/1916 | Maher | 74/558 |
| 1,235,549 | 8/1917 | Burroughs | 74/558 |
| 1,275,217 | 8/1918 | Caldwell | 74/558 |
| 1,317,730 | 10/1919 | Ryan | 74/558 |
| 1,391,108 | 9/1921 | Hamblet | 74/558 |
| 1,876,993 | 9/1932 | Manning | 74/558 |
| 2,491,803 | 12/1949 | De Heras et al. | 74/558 |
| 3,489,031 | 1/1970 | Meier | 74/558 |
| 3,530,739 | 9/1970 | Meier | 74/558 |
| 3,726,152 | 4/1973 | Tsneizumi | 74/558 X |
| 4,800,776 | 1/1989 | Strongwater | 74/558 |
| 5,213,007 | 5/1993 | Yoo | 74/552 X |
| 5,224,397 | 7/1993 | Yoo | 74/552 X |

FOREIGN PATENT DOCUMENTS 330243 6/1930 United Kingdom .................. 74/558

Primary Examiner—Leslie A. Braun
Assistant Examiner—Ryan W. Massey
Attorney, Agent, or Firm—Wells, St. John, Roberts, Gregory & Matkin

[57] ABSTRACT

A cover for vehicle steering wheels that includes a base panel adapted to be stretched over an annular steering wheel and a pair of gripper panels secured to an outside surface of the base panel. The gripper panels are oriented on the base panel to provide preferred, safe positions for the vehicle operator to grasp. A plurality of spaced nodules extend outwardly of the gripper panels which provide an improved grip of the steering wheel and massage the vehicle operator's palms and fingers during extended periods of vehicle operation.

2 Claims, 4 Drawing Sheets

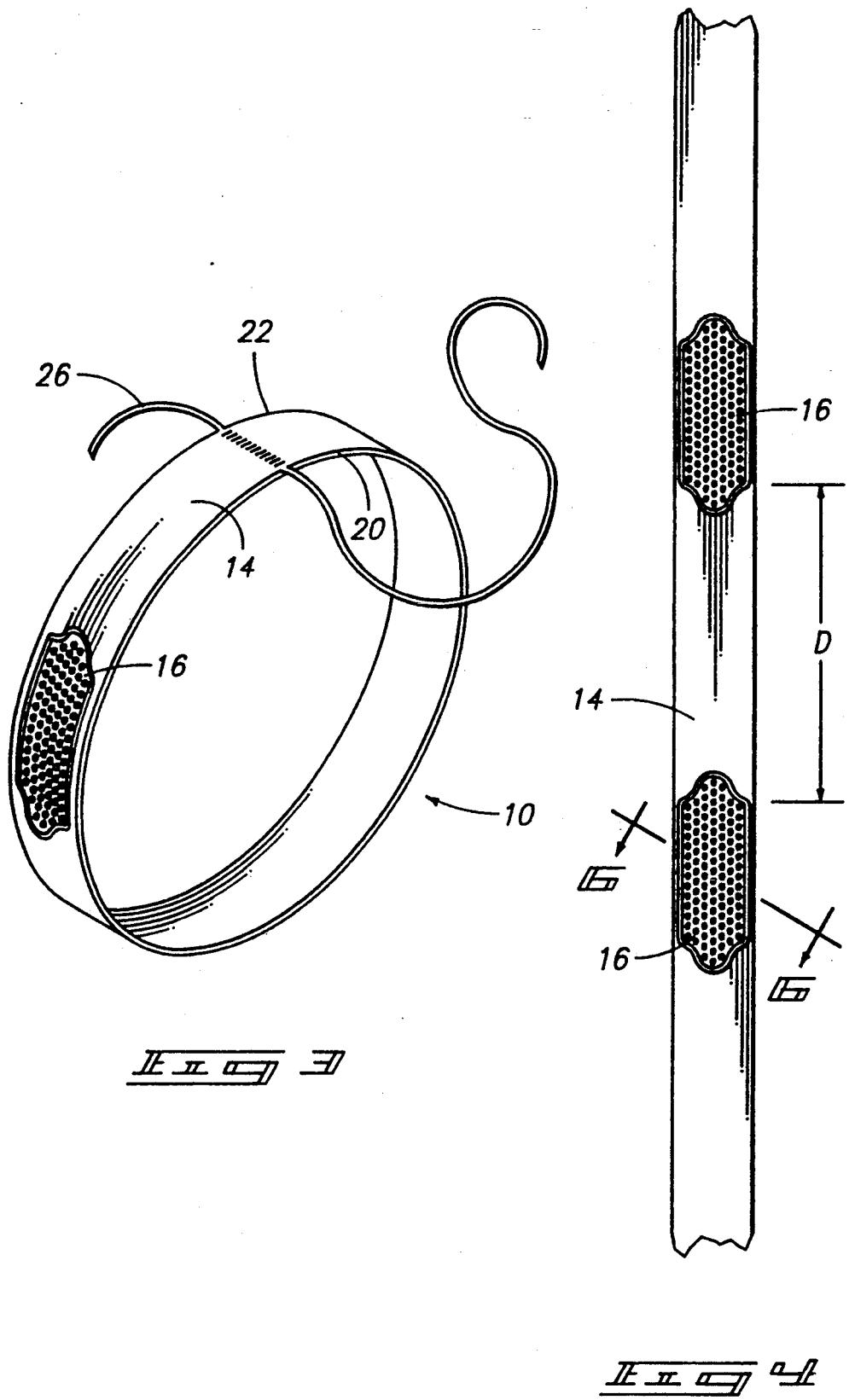

VEHICLE STEERING WHEEL COVER

TECHNICAL FIELD

This invention relates to vehicle accessories, and more particularly, to covers for vehicle steering wheels.

BACKGROUND OF THE INVENTION

The need for providing an adequate means for grasping a steering wheel of a vehicle has long been recognized. Factors such as extreme temperature fluctuation, vehicle vibrations, and length of driving time affect the vehicle operator's ability to maintain an adequate grip on the steering wheel.

Some traditional steering wheels have been manufactured in an attempt to improve the operator's grasp of the steering wheel. For example, some steering wheels include a plurality of grooves or recesses to provide a grasping location for the operator's fingers. These steering wheels, however, generally do nothing to combat the effects of extreme hot or cold temperatures or vibrations of the vehicle transmitted through the steering wheel.

More recently, steering wheel covers have been developed which are stretched or wrapped over the steering wheel and secured in place by a strap or other type of cord which is helically wrapped around the cover and the steering wheel. Such covers are usually made of leather or some other type of soft compressible material to provide an insulated, cushioned grip to reduce the effects of extreme cold in the winter time and heat in the summertime. These covers also make the steering wheel easier and more comfortable to grasp.

There remain, however, several drawbacks with respect to these known devices for improving the grip of a steering wheel. First, these prior devices do not prevent the palms and fingers of the driver's hands from sweating because of the constant surface contact between the operator's palms and fingers and the surface of the steering wheel or steering wheel cover. During times of hot weather, the operator's hands may perspire and leave a slippery residue on the surface of the steering wheel or steering wheel cover. Even in the wintertime, once the inside temperature of the automobile reaches a level within or above the comfort zone, this same problem may occur, particularly when the vehicle is operated over long periods of time.

Another problem with respect to traditional devices for improving the driver's ability to grasp the steering wheel handle is that over extended hours of operation, the driver's hands become fatigued and stressed because of the constant tension of the muscles in the hands required to grip the steering wheel. Any amount of stress and fatigue will affect the driver's ability to maintain a firm grasp of the steering wheel and thus maintain adequate control of the vehicle.

Still another problem with the known steering wheel devices is that there is generally no structural incentive for the driver to place both hands in proper, safe positions on the steering wheel. In light of the above-mentioned problems concerning fatigue and sweating, there is a tendency to minimize the amount of contact between the operator's hands and fingers and the steering wheel. This minimal contact may be inadequate for proper handling of the vehicle and may, under certain circumstances, cause the operator to lose control of the vehicle.

Accordingly, there is a substantial need to provide a device for improving an operator's grip of a vehicle steering wheel, for relieving finger and hand stress during extended periods of driving, and for motivating the operator to place both hands on the steering wheel in proper, safe positions.

The present invention involves a steering wheel cover which overcomes many of the above-identified problems. Other features and advantages of the present invention will become apparent from the detailed description of the invention which follows.

BRIEF DESCRIPTION OF THE DRAWINGS

One or more preferred forms of the invention are described herein with reference to the accompanying drawings. The drawings are briefly described below.

FIG. 3 is a perspective view of the preferred steering wheel cover of the present invention before being secured to a steering wheel.

FIG. 4 is a top plan view of the steering wheel cover shown in a cut-away, extended position to show the orientation of the gripper panels.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

Figure 1:
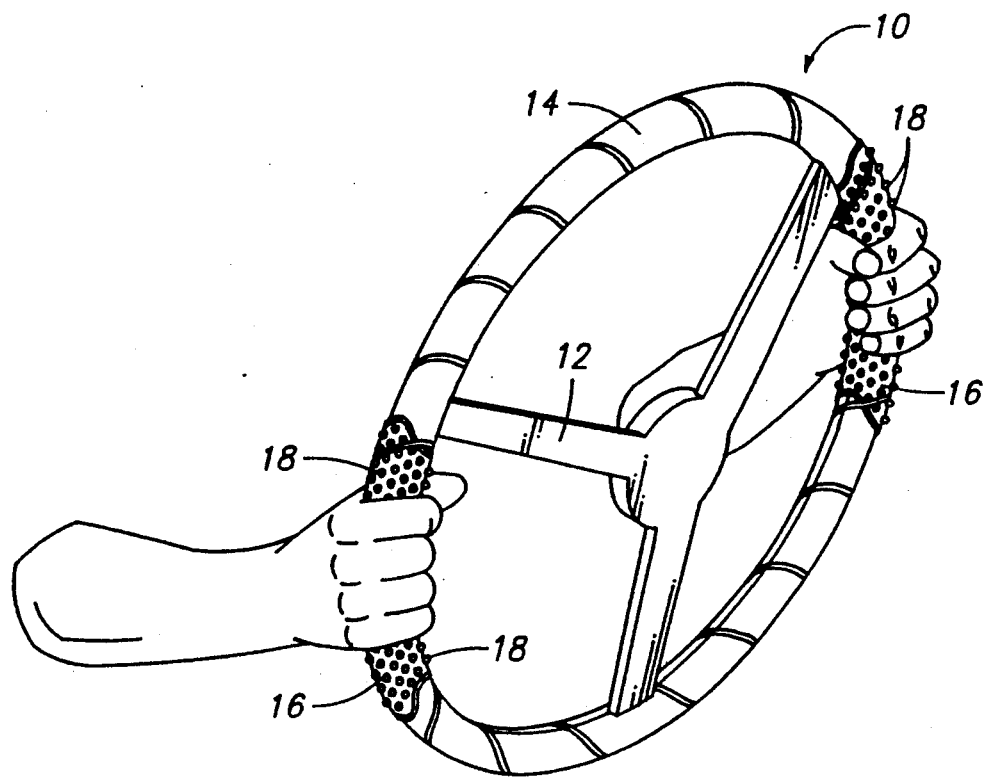
FIG. 1 is a perspective view of a preferred embodiment of a steering wheel cover secured to a steering wheel of a vehicle.
Figure 2:
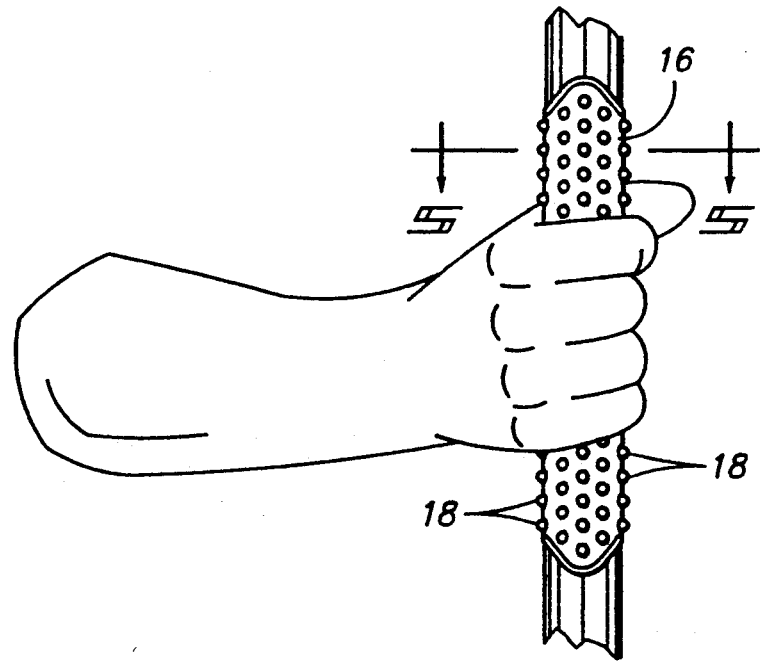
FIG. 2 is an enlarged perspective view of a gripper panel of the steering wheel cover of FIG. 1.

With reference to FIG. 1, the present invention involves a steering wheel cover 10 adapted to be secured around an annular steering wheel 12. The steering wheel cover 10 comprises two main portions: a base panel 14 and a pair of gripper panels 16 secured to the base panel 14.

The base panel 14 may be made of leather or other compressible synthetic material. The gripper panels 16 are preferably made of a less compressible material relative to the base panel, such as a synthetic plastic or vinyl, to retain their rigidity when gripped by the vehicle operator.

The gripper panels 16 are oriented on the base panel 14 at specific locations so that the cover 10 can be positioned on the steering wheel 12 with the gripper panels 16 oriented in preferred positions for the operator's hands during normal operation of a vehicle. The gripper panels preferably have a length which corresponds to a typical operator's hand and a width which covers substantially the entire width of the base panel 14.

Figure 5:
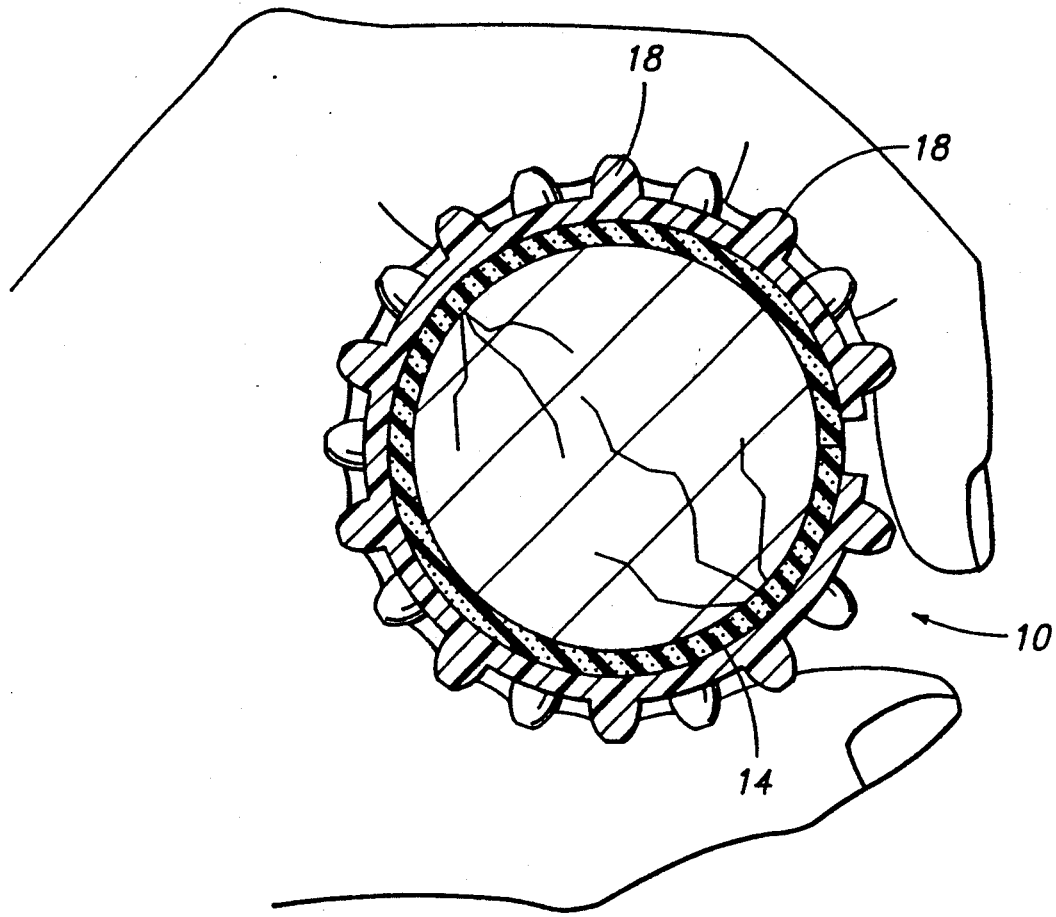
FIG. 5 is a sectional top plan view, taken along the line 5—5 of FIG. 2, of a hand grasping the steering wheel cover secured to the vehicle steering wheel.

As shown in FIGS. 1–6, a plurality of bumps or nodules 18 extend outwardly from the gripper panels 16. The nodules are located at spaced positions on substantially the entire surface of the gripper panels 16 so that when the driver's hands are placed about the gripper panels, virtually every portion of the operator's fingers and palms that come in contact with the steering wheel cover 10 will engage one or more nodules 18 (FIG. 5).

FIG. 3 shows the steering wheel cover 10 alone, prior to being stretched over a steering wheel. When undistorted (i.e., when not stretched over a steering wheel), the base panel 14 of the steering wheel cover 10 takes the form of a cylinder having a front edge 20 and a rear edge 22. After the cover 10 is stretched over a steering wheel (FIG. 1), the cover 10 takes the form of a torus.

A length of cord or cable 24 extends outwardly from the front edge 20 of the base panel 14 and is helically wrapped around the cover 10 after it has been stretched over the steering wheel 12 (FIG. 1) to secure the cover 10 to the steering wheel 12. A tie-off cord 26 extends outwardly from the rear edge 22 so that the free end of cord 24 can be tied together with cord 26 to secure the cover 10 in the desired position.

FIG. 4 shows the base panel 14 of the steering wheel cover 10 in a straightened-out position to show the preferred orientation of the gripper panels on the base panel 14. The gripper panels 16 are spaced a preferred distance D from one another. The distance D may vary depending on the size of the steering wheel to be covered so that the gripper portions can be positioned at proper locations about the steering wheel.

Figure 6:
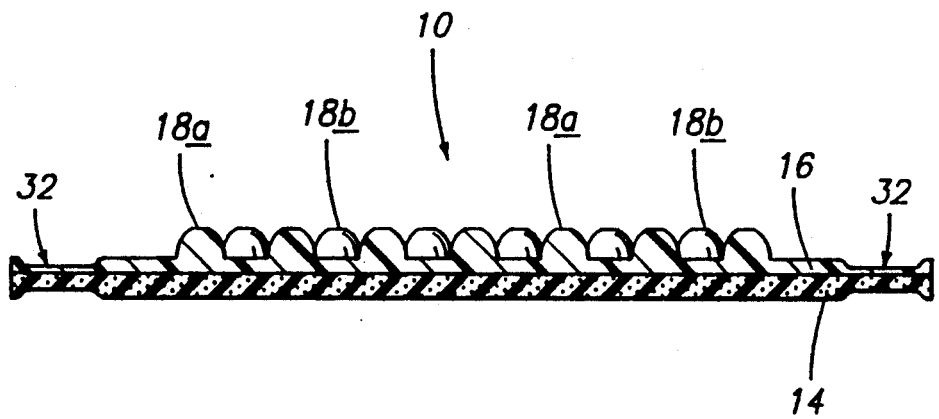
FIG. 6 is a sectional side elevation view, taken along the line 6—6 of FIG. 4, of the gripper panel secured to the base panel.
Figure 7:
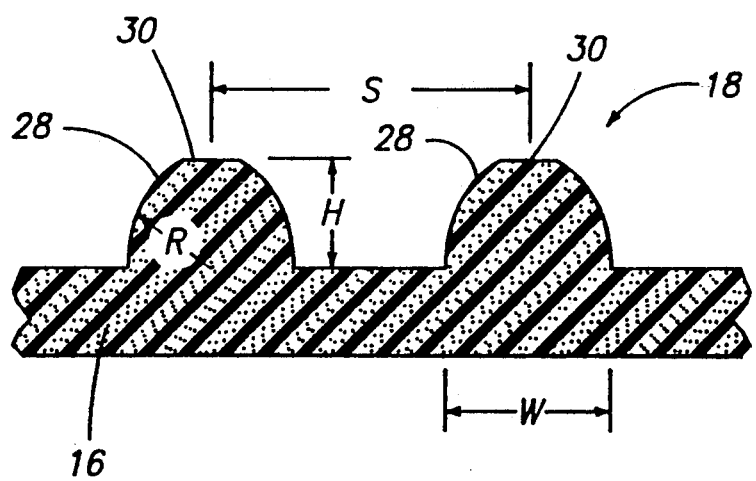
FIG. 7 is an enlarged view of a pair of nodules extending from the gripper panel of FIG. 6.

More detailed views of the nodules 18 are shown in FIGS. 5-7. With reference to FIG. 5, when the cover is grasped by the vehicle operator, the nodules 18 cause the skin surface of operator's palms and fingers to become slightly indented. This allows for an improved grip and better handling of the steering wheel 12. Over extended periods of vehicle operation, the nodules 18 in combination with the vehicle vibrations massage the palms and fingers of the operator to minimize stress and fatigue. Further, vehicle operators can move their hands over the surface created by the nodules 18 to massage their hands and relieve stress.

Since the nodules 18 have a distinct feel, as compared to the base panel 14, the gripper panels 16 are quickly locatable by the operator without having to divert attention away from the operating environment. The gripper panels 16 may also provide an indication of the direction of the wheels when the vehicle is in a parked position to warn the operator of the vehicle's initial direction of movement.

The nodules 18 also create a unique buffer between the operator's palms and fingers and the gripper panels 16. As shown in FIGS. 4 and 6, the nodules are oriented in rows and columns. The columns of nodules in a given row are offset with respect to nodules in an adjacent row. As shown in FIG. 6, a first row of nodules 18a (shown in cross section) are offset with respect to the nodules 18b in an adjacent row. This allows the nodules to be more closely spaced together to form a relatively high density of nodules, which maintains the palms and fingers of the operator separated from the gripper panel 16. This close spacing also ensures that air will continue to circulate between the gripper panel 16 and the operators palms and fingers (FIG. 5) to provide comfort, reduce the perspiration, and prevent accumulation of a slippery residue on the steering wheel cover 10.

The preferred embodiment of the invention shows the nodules 18 extending from the gripper panel 16 which is secured, in turn, to the base panel 14. It should be understood, however, that the nodules could alternatively extend directly from or be attached to the base panel 14 in a variety of selected locations to achieve the objectives of the present invention.

The gripper 16 panels may be secure to the base panel 14 in any conventional manner. In a preferred embodiment, shown in FIG. 6, a synthetic gripper panel 16 is secured to a synthetic base panel 14 by heat welding the gripper panel 16 at its peripheral edge 32 to the base panel 14. This condenses the material of both the gripper panel and the base panel at the point of the heat weld. Alternatively, the gripper panels 16 may be sewn onto the base panel 14.

FIG. 7 shows an enlarged view of a pair of nodules 18, including their geometry. The nodules 18 extend integrally from the gripper panel 16. The exterior surface of each nodule 18 includes a rounded surface area defined by a radius of curvature R and terminates in a flat, top surface 30 at the apex of the nodule 18. The flat, top surface 30 is provided to make the nodule more comfortable and easier to grasp and to eliminate any sharp pressure points that might otherwise cause discomfort to the operator or make the steering wheel more difficult to grasp.

The geometry and spacing of the nodules 18 are important aspects in providing the benefits described above. The height H of each nodule is, in a preferred embodiment, approximately 4 millimeters, but could also fall within an acceptable range from 3 to 7 millimeters. The width W of each nodule is approximately 5 millimeters, but could also acceptably be between 3 to 7 millimeters. The radius of curvature R is preferably between 3 to 5 millimeters. The center-to-center spacing S between nodules 18 in the same row is preferably 10 millimeters, but could also be between 7 to 14 millimeters without departing from the scope of the present invention.

The spacing between rows is generally less than the spacing between the nodules in a given row. A preferred spacing between rows will generally be from 6 to 8 millimeters. Since the nodules in adjacent rows are offset from one another, the spacing between rows can be reduced to group more nodules 18 within a given area to create an increased density of nodules 18. The combination of the primary dimensions H, R, W, and S, in addition to the spacing between adjacent rows and the offset lateral alignment of nodules 18 from row to row, create a preferred nodule density that has been found to achieve the benefits of an improved grasp of the steering wheel, relief from stress and fatigue of palms and fingers, and air circulation between palms and fingers and the steering wheel cover to minimize perspiration.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

I claim:

1. A cover for a steering wheel of a vehicle, comprising:

a base panel having a width, the base panel being adapted to be placed over a steering wheel of a vehicle;

attachment means for securing the base panel to the steering wheel;

a first gripper panel having a surface area defined by a length and a width, the length substantially corresponding to a typical operator's hand and the width covering substantially the entire width of the base panel, the first gripper panel being secured to the base panel for providing a gripping location for an operator's hand to improve handling of the steering wheel, the first gripper panel being positioned on the base panel to correspond with a preferred location for the operator's hand;

grip enhancement means secured to the first gripper panel for improving the operator's grip of the steering wheel and reducing stress and fatigue of the operator's hand from prolonged vehicle operation; and wherein the first gripper panel is heat welded to the base panel.

2. A cover for a steering wheel of an automotive vehicle, comprising:

an annular base panel adapted to be placed over a steering wheel of a vehicle;

attachment means for securing the base panel to the steering wheel;

a pair of gripper panels, each having a surface area defined by a length and a width, the length substantially corresponding to a typical operator's hand and the width covering substantially the entire width of the base panel, the gripper panels being secured to a top surface of the base panel at spaced locations for providing preferred gripping locations for an operator's hands to improve handling of the steering wheel;

a plurality of spaced nodules extending outwardly from each gripper panel for reducing vibrations of the vehicle imparted to the hands of the operator through the steering wheel and for improving the operator's grip of the steering wheel, the nodules being oriented in spaced rows and spaced columns, the nodules in a given row being laterally offset from the nodules in an adjacent row;

wherein each nodule includes an exterior surface having a rounded surface area defined by a radius of curvature, the exterior surface terminating in a flat, top surface at an apex of the nodule to eliminate a sharp pressure point at the apex of the nodule and make the steering wheel cover more comfortable and easier to grasp, the nodules being adapted to engage and massage the palm and fingers of the operator's hand to provide stress relief during prolonged driving; and wherein the first gripper panel is heat welded to the base panel.

* * * * *